United States Patent [19]

Danko, Jr.

[11] Patent Number: 4,593,802
[45] Date of Patent: Jun. 10, 1986

[54] FRICTION MATERIAL

[75] Inventor: Donald M. Danko, Jr., Broadview Heights, Ohio

[73] Assignee: The S. K. Wellman Company, Bedford, Ohio

[21] Appl. No.: 540,445

[22] Filed: Oct. 11, 1983

[51] Int. Cl.$^4$ .................... F16D 69/02; C09K 3/14
[52] U.S. Cl. .................... 192/107 M; 106/36
[58] Field of Search .................. 192/107 M, 107 R; 106/36; 523/155, 156; 524/495

[56] References Cited

U.S. PATENT DOCUMENTS

| | | | |
|---|---|---|---|
| 2,554,548 | 5/1951 | Albagnac | 192/107 M |
| 3,731,769 | 5/1973 | Ely | 192/107 M |
| 3,831,401 | 8/1974 | Hurwitz | 192/107 M |
| 3,898,361 | 8/1975 | Bjerk et al. | 192/107 M |
| 3,948,363 | 4/1976 | Ely | 192/107 M |
| 4,119,189 | 10/1978 | Ehrenreich | 192/107 M |
| 4,256,801 | 3/1981 | Chuluda | 192/107 M |
| 4,280,935 | 7/1981 | Ogiwara | 192/107 M |
| 4,291,794 | 9/1981 | Bauer | 192/107 M |
| 4,339,021 | 7/1982 | Kosuda et al. | 192/107 M |
| 4,418,115 | 11/1983 | LeLannoo | 192/107 M |

*Primary Examiner*—Alan Cohan
*Assistant Examiner*—John A. Rivell
*Attorney, Agent, or Firm*—Pearne, Gordon, Sessions, McCoy, Granger & Tilberry

[57] ABSTRACT

A friction facing material comprising a fluorocarbon resin binder containing elemental carbon is disclosed for use in torque-transmitting applications in the presence of a transmission fluid or oil. The friction facing material is characterized by a stable dynamic coefficient of friction. A method of making the friction facing material and incorporating it into torque-transmitting apparatus is also disclosed.

15 Claims, No Drawings

FRICTION MATERIAL

BACKGROUND OF THE INVENTION AND PRIOR ART

The present invention relates to torque-transmitting apparatus having a friction facing material operably engageable with an opposing surface material in the presence of a transmission fluid or oil. More particularly, the invention relates to an improved friction facing material including a fluorocarbon polymer and to methods of preparing such friction facing materials for use in torque-transmitting apparatus.

The torque-transmitting apparatus comprises clutch and brake assemblies of the disc and opposing plate type. The friction facing material is secured to a metallic core to provide the friction or torque-transmitting surface of the disc. The opposing plate provides a cooperating surface which operably engages the friction material for purposes of torque transmission. A plurality of discs having friction facing material secured on each of the opposite surfaces thereof are typically interleaved with a plurality of opposing plates to provide a multiple disc torque-transmitting apparatus. Torque transmission is regulated by closing means which control the axial proximity of the adjacent discs and plates.

The disc and opposing plate may extend into a reservoir of transmission fluid, or the fluid may be delivered to the disc under pressure from such reservoir or from a remote reservoir. The fluid serves to cool the apparatus by dissipating the heat energy resulting from torque transmission, this being referred to as "wet operation" of the unit. The fluid may also serve to transmit torque by the shearing of films of fluid between adjacent discs and plates, as well as to dissipate heat, this being referred to as "hydroviscous operation" of the apparatus.

The heavier duty torque-transmitting apparatus and applications of concern herein are of the type encountered in large road vehicles, such as buses and trucks as well as off-the-highway and construction vehicles. In order to meet the torque loading requirements of such applications, friction facing materials, including major proportions of elemental carbon in a resin binder matrix, have been developed. For example, U.S. Pat. No. 3,261,440, assigned to the assignee herein and incorporated by reference, discloses friction facing materials containing elemental carbon in amounts exceeding 50% by weight. (All percentages are by weight unless otherwise indicated.)

The performance of such friction facing materials has been further improved through the use of epoxy resin binder materials and additives. However, these friction facing materials have not been entirely satisfactory, especially when used in combination with certain transmission fluids known to have high plating-out characteristics which are believed to be associated with decay of the dynamic coefficient of friction. The plating-out phenomenon refers to the formation of thin films of organic material on either or both of the cooperating torque-transmitting surfaces.

The torque transmission characteristics are determined by a number of factors, including the particular transmission fluid and the friction facing material as well as the nature of the cooperating opposing plate surface. Further, the torque transmission characteristics tend to vary with continued use and wear of the friction facing material, as well as the occurrence of plating-out of the oil, as noted above.

The maintenance of a stable dynamic coefficient of friction over the wear life of the friction facing material is desirable, since it tends to assure that the same energy transmission and performance also occur over the life of the system. Further, a stable coefficient affords smooth operation and tends to avoid distinctive initial operating characteristics during a "break-in" period. This is of particular concern in heavier duty applications, such as large vehicles or high load machinery.

Heretofore, certain combinations of friction facing material, opposing surfaces, and oil have provided a reasonable degree of stability of the coefficient throughout the wear life of the device. However, even in such cases, these satisfactory operational characteristics may be lost by the end user's replacement of the transmission oil with an oil which does not enable the synergistic effect of the combination but is otherwise acceptable.

The prior art teaches the use of fluorine-substituted elastomeric materials to provide friction facing materials in torque-transmitting apparatus. U.S. Pat. Nos. 3,261,440 and 4,042,085 are representative of such prior art teachings. These fluoro-elastomers have not provided entirely satisfactory performance.

Other elastomeric materials, such as nitrile rubber, have not been found to provide reproducible results when incorporated into high carbon content friction facing materials of interest herein. These problems have been accompanied by the added difficulties of rubber-type processing including formulation with the use of Banbury mixers and similar devices in an attempt to provide acceptable mixtures of additives.

SUMMARY OF THE INVENTION

It has now been discovered that friction facing materials containing at least 35% by weight elemental carbon in a fluorocarbon polymer binder provide stable dynamic coefficient of friction characteristics. Such friction facing materials have been found especially useful in combination with transmission fluids heretofore found to be unsatisfactory and to display undesirable plating-out characteristics.

The fluorocarbon polymers are exemplified by polytetrafluoroethylene (PTFE). Molding grade PTFE useful in the powder molding fabrication techniques employed herein is sold under the HALON trademark by Allied Corporation and the TEFLON trademark by E. I. DuPont de Nemours. The present invention may also be practiced with the use of a fluorinated ethylenepropylene copolymer (FEP) and certain perfluoroalkoxy copolymers (PFA), which are also marketed under the TEFLON trademark by DuPont.

The friction facing material should contain from 35% to 80% elemental carbon. The carbon may be present in both its crystalline form, as in carbon black or graphite, and its amorphous forms obtained in petroleum coke, lampblack, charcoal, and like sources. Accordingly, both coke and graphite may be present and together provide the total amount of elemental carbon. Generally, the elemental carbon will be present in an amount ranging from about 45% to 70%, with no more than about 10% thereof being in the crystalline form.

The friction facing material should contain from about 15% to 50% by weight fluorocarbon polymer, and generally from about 22% to about 40%. It is presently believed that the optimization of properties occurs with about 30% to about 35% fluorocarbon polymer.

In addition to conventional additives, such as pumice, micro-cellulose and paraffin-type release agent, the fluorocarbon may also contain reinforcing fibers. Such reinforcing fibers include glass fibers, carbon fibers, graphite fibers, metallic fibers, ceramic fibers, and mineral fibers.

As indicated above, the method of fabrication of the friction facing material parallels that used in powder metallurgy or ceramics. Accordingly, a dry blend of the particulate polymer, elemental carbon, and other additives is subjected to cold-pressing under ambient temperature conditions in order to form a green friction facing compact. The term "particulate" as used herein is intended to include the fine powder size of the molding powder resin and the various forms of carbon.

The compact is sintered to provide a substantially homogeneous fluorocarbon binder having the elemental carbon and other additives uniformly distributed therein. The sintering is carried out at temperatures in the range of 550° to 750° F.

The friction facing compact of the present invention has significantly increased green strength and handling characteristics as compared with the prior art epoxy systems which are also powder molded. The increased green strength of the fluorocarbon compacts has enabled and substantially facilitated automation of the disc assembly procedure which was previously labor-intensive.

In contrast with prior epoxy resin systems, the sintering and/or cure of the fluorocarbon binder matrix need not be performed under pressure. More particularly, green epoxy compacts were sintered while retained in a fixture which imposed compressive forces, in order to densify the resulting binder matrix and provide acceptable hardness and wear properties. The fluorocarbon facing compacts are sintered under ambient pressure conditions and, therefore, this step may be performed by simply conveying the green compacts through a suitable heating oven.

The sintered friction facing material is secured to a metallic core by means of a suitable adhesive. Conventional phenolic adhesive materials have provided satisfactory results.

In contrast with prior elastomeric systems, the fluorocarbon polymers of the present invention have been found to provide reproducible and satisfactory torque transmission characteristics. The dynamic coefficient of friction is stable, with acceptable variation being limited to less than about 25% of the original value. This stability is displayed in a variety of transmission fluids including two of the most widely used types: D. A. Torque Fluid, a type C-3 fluid by D. A. Lubricant Company and Dexron II, a petroleum-based oil by Phillips Petroleum Company. The improved performance is believed to be related to the substantial elimination of plating-out on the friction surfaces.

DETAILED DESCRIPTION OF THE INVENTION

The improved stability of the dynamic coefficient of friction in accordance with the present invention is illustrated hereinafter by durability tests which simulate the anticipated wear of the friction facing materials. The fluorocarbon polymer binders are compared with a standard epoxy friction facing material. The standard epoxy composition is an optimized formulation found acceptable in heavy duty commercial applications when used in combination with preferred transmission fluids.

The standard epoxy and fluorocarbon friction facing material formulations are summarized in Table I below. As indicated, the standard material of Example 1 was duplicated in Example 2 but for the substitution of PTFE for the epoxy. The effects of increasing proportions of fluorocarbon binder are demonstrated by Examples 3 through 8.

TABLE I

| | COMPOSITION WEIGHT PERCENT | | | | | | | |
|---|---|---|---|---|---|---|---|---|
| EXAMPLE | 1 | 2 | 3 | 4 | 5 | 6 | 7 | 8 |
| Teflon 7C[1] | | | | | 30 | 35 | 40 | |
| Halon[2] | | 22 | 26 | 30 | | | | 40 |
| Epoxy[3] | 22 | | | | | | | |
| Coke | 58 | 58 | 55 | 52 | 52 | 49 | 52 | 45 |
| Graphite | 10 | 10 | 9 | 9 | 9 | 8 | 0 | 7 |
| Pumice | 5 | 5 | 5 | 4.5 | 4.5 | 4 | 4 | 4 |
| Avicel[4] | 5 | 5 | 5 | 4.5 | 4.5 | 4 | 4 | 4 |
| Acrawax[5] | 1 | 1 | 1 | 1 | 1 | 1 | 1 | 1 |

[1] A PTFE molding resin by E. I. DuPont de Nemours
[2] A PTFE molding resin by Allied Corporation
[3] An epoxy molding resin, single component
[4] Microcrystalline cellulose by FMC Corporation
[5] A paraffin-based mold release agent The epoxy and fluorocarbon friction facing materials were prepared using identical powder molding techniques through the preparation of the green friction facing compact. Accordingly, the resin powder, carbon, and indicated additives were dry-blended in a cone or "V" blender to provide an intimate mixture thereof. The blended mixture was then deposited in a mold cavity and cold-pressed at ambient temperature and a pressure of 12 to 18 tons/in.$^2$ to provide green friction facing compacts. Thereafter, the processing varied as indicated below.

The epoxy resin of the standard requires cure under pressure and, therefore, the green epoxy compacts were assembled with metallic cores having an epoxy adhesive coated thereon. The assemblies were placed in a fixture which exerts a mechanical compression load on the compacts to assure densification of the resin matrix and uniform bonding to the core. The compacts were sintered and bonded to the cores at a temperature of 450° F. and a pressure of 250 psi.

The green fluorocarbon compacts were sintered at 700° F., for 2½ hours. The sintering was carried out in an oven, and no external pressure was applied to the assembled compacts and cores. The sintered compacts are strong enough to permit most forms of automatic assembly with the cores. Herein, the sintered compacts were adhered to the cores using conventional heat-activated phenolic adhesives and pressure techniques to assure an intimate bond.

The epoxy and fluorocarbon friction discs or elements prepared in the foregoing manner were tested under identical conditions in Dexron II transmission fluid. (This transmission fluid is distributed by Phillips Petroleum Company.) In this test, sequential braking engagements were performed. Each engagement is designed to expend 13,500 lbs.-ft. of energy by bringing to rest a flywheel initially rotating at a speed of 2400 rpm. Following about 20,000 to 25,000 engagements under these conditions, it is believed that the friction facing material wear and the transmission fluid plating-out effects upon the dynamic coefficient of friction reach an equilibrium condition and no significant further changes occur in the coefficient. Accordingly, it is further believed that the change in the coefficient over the wear life of the friction facing material may be projected from the performance observed during 30,000 engagements in accordance with this test.

Referring to Table II below, the original or initial dynamic coefficients of friction are reported. The percent loss of the original coefficient of friction is reported for the standard epoxy material of Example 1, and the fluorocarbon test examples following the indicated number of engagements. Generally, the coefficient should vary by no more than 25% of its original value in order to ensure stable and uniform operation of the torque transmitting apparatus. Preferably, the variation will be no greater than 15%.

TABLE II

| NUMBER OF ENGAGEMENTS | PERCENT LOSS OF ORIGINAL DYNAMIC COEFFICIENT OF FRICTION[1] | | | |
|---|---|---|---|---|
| | EXAMPLE I | EXAMPLE II | EXAMPLE IV | EXAMPLE VIII |
| 1500 | 6.9 | 7.9 | 4.6 | 0 |
| 4500 | 16.0 | 11.1 | 4.6 | 0 |
| 9000 | 20.6 | 13.5 | 4.6 | 0 |
| 18000 | 25.2 | 15.9 | 6.5 | −2.8 |
| 30000 | 25.2 | 16.7 | 4.6 | 0 |
| ORIGINAL COEFFICIENT | 0.130 | 0.126 | 0.108 | 0.105 |

[1]Percent loss is the percentage decrease in the coefficient after the indicated number of engagements based on the original value of the coefficient.

It is apparent from Table II that the standard epoxy material displayed a significantly greater rate of decay of dynamic coefficient than the fluorocarbon binders of the present invention. The coefficient of the standard material was reduced by 30% prior to the occurrence of one-sixth of the total number of engagements. On the other hand, the fluorocarbon binders of the present invention displayed acceptable, and even preferred, performance, with no more than about 17% decrease in the coefficient.

Referring to Table III, the coefficient of friction and wear results obtained upon testing the indicated fluorocarbon friction facing materials are reported. The composition of the standard material and each of the fluorocarbon materials is as indicated in Table I.

In the tests of Table III, the dynamic coefficient of friction and the wear were measured for each of the friction materials following 2000 engagements at the indicated energy level. Thus, a total of 6000 braking engagements was imposed upon each sample. The first energy level simulates loadings encountered in highway passenger bus and tractor trailer applications. Assuming a dynamic coefficient of friction value of 0.120, this first energy level corresponds with a unit kinetic energy value of 360 ft.-lbs./in.$^2$. The second energy level simulates the loads encountered in off-the-highway equipment such as construction vehicles, and such loads correspond with a unit kinetic energy value of 506 ft.-lbs./in.$^2$. The third energy level corresponds with overload conditions not expected to be of regular frequency or long duration in actual applications. The unit kinetic energy in this instance is 767 ft.-lbs./in.$^2$. Thus, the higher energy level engagements correspond with exceptional torque loadings during normal usage, and the test is intended to reach the torque loading and operational limits of the friction facing materials.

TABLE III

| | EXAMPLE NUMBER | | | | | | | |
|---|---|---|---|---|---|---|---|---|
| | 1 | 2 | 3 | 4 | 5 | 6 | 7 | 8 |
| DYNAMIC COEFFICIENT OF FRICTION (AVE.) | | | | | | | | |
| 1st Energy Level | 0.121 | 0.128 | 0.125 | 0.127 | 0.123 | 0.124 | 0.115 | 0.111 |
| 2nd Energy Level | 0.111 | 0.116 | 0.117 | 0.112 | 0.111 | 0.107 | 0.102 | 0.091 |
| 3rd Energy Level | 0.105 | 0.112 | 0.107 | 0.105 | 0.098 | 0.094 | 0.090 | 0.078 |
| WEAR (MILS) | | | | | | | | |
| 1st Energy Level | 1.4 | 4.7 | 3.2 | 1.9 | 3.5 | 2.3 | 2.6 | 2.5 |
| 2nd Energy Level | 2.0 | 1.5 | 1.9 | 1.6 | 0.9 | 0.4 | 1.3 | 2.7 |
| 3rd Energy Level | 1.8 | 3.5 | 2.7 | 2.7 | 2.2 | 2.1 | 1.3 | * |
| TOTAL WEAR | 5.2 | 9.7 | 7.8 | 6.2 | 6.6 | 4.8 | 5.2 | |

1st Energy Level, 13,500 lb-ft., 2000 engagements
2nd Energy Level, 18,975 lb-ft., 2000 engagements
3rd Energy Level, 28,769 lb-ft., 2000 engagements
Dexron II fluid used in all tests.
*Bond failure As indicated in Table III, satisfactory coefficient and wear results are obtained in all cases with the use of fluorocarbon binders. The percentage of decrease in the dynamic coefficient is maintained within acceptable ranges in all cases in view of the increased energy level testing. As reported, there is some variation in wear which indicates preferred fluorocarbon amounts to be in the range of 30% to 35% by weight.

Although the preferred embodiment of this invention has been shown and described, it should be understood that various modifications and rearrangements of the parts may be resorted to without departing from the scope of the invention as disclosed and claimed herein.

What is claimed is:

1. A friction facing material operably engageable with an opposing surface material in the presence of a transmission fluid, said friction facing material comprising a sintered matrix of a fluorocarbon resin binder containing more than 35% by weight elemental carbon distributed therein as a particulate material.

2. A friction facing material as set forth in claim 1, wherein said friction facing material comprises about 20% to about 40% by weight of said fluorocarbon resin binder and from about 50% to about 80% by weight of said elemental carbon.

3. A friction facing material as set forth in claim 1 or 2, wherein said fluorocarbon binder is selected from the group consisting of a homopolymer of tetrafluoroethylene and a copolymer of tetrafluoroethylene and hexafluoropropylene.

4. A friction facing material as set forth in claim 1 or 2, wherein said fluorocarbon binder is a perfluoroalkoxy resin.

5. A friction facing material as set forth in claim 1, wherein said fluorocarbon resin comprises from about 15% to about 50% by weight of said friction facing material.

6. A friction facing material as set forth in claim 1 or 2, wherein said fluorocarbon resin binder comprises from about 30% to about 35% by weight of said friction facing material.

7. A friction facing material as set forth in claim 1, wherein said assembly is characterized by a dynamic coefficient of friction and said dynamic coefficient of friction does not vary by more than about 25% of its original value throughout the projected wear life of said friction facing material.

8. A friction facing material as set forth in claim 1, wherein said assembly is characterized by a dynamic coefficient of friction and said dynamic coefficient of friction does not vary by more than about 15% of its original value throughout the projected wear life of said friction facing material.

9. A friction facing material operably engageable in the presence of a transmission fluid with an opposing plate material to control the transmission of torque therebetween, said friction facing material comprising a fluorocarbon binder matrix containing more than 35% by weight elemental carbon, and said fluorocarbon binder being selected from the group consisting of polytetrafluoroethylene and a fluorinated ethylene propylene copolymer.

10. A friction facing material as set forth in claim 9, wherein saiid fluorocarbon binder is present in an amount ranging from about 15% to about 50% by weight and comprises the sole binder for said friction facing material.

11. A friction facing material as set forth in claim 9, wherein said friction facing material comprises from about 20% to about 40% by weight fluorocarbon polymer and from about 45% to about 70% by weight elemental carbon.

12. A friction facing material as set forth in claim 11, wherein said elemental carbon is selected from the group conisting of coke, graphite, and mixtures of coke and graphite.

13. A friction facing material as set forth in claim 9, 10, or 11, wherein said friction facing material has a coefficient of dynamic friction which does not vary by more than about 25% of its original value throughout the projected wear life of the friction facing material.

14. A friction facing material as set forth in claim 9, wherein the unit kinetic energy loads imposed upon said friction facing material are in the range of 360 ft.-lbs./in.$^2$ or greater.

15. A friction facing material as set forth in claim 1, wherein said friction facing material optionally includes one or more fiber additives selected from the group consisting of glass fibers, carbon fibers, graphite fibers, metallic fibers, ceramic fibers, and mineral fibers.

* * * * *